July 21, 1970 C. PALI ET AL 3,521,561
METHOD AND APPARATUS FOR CONTOURING A ROTOGRAVURE DOCTOR BLADE
Filed Jan. 15, 1968 4 Sheets-Sheet 1

INVENTORS.
JACK BRYER
CHRISTOPHER PALI

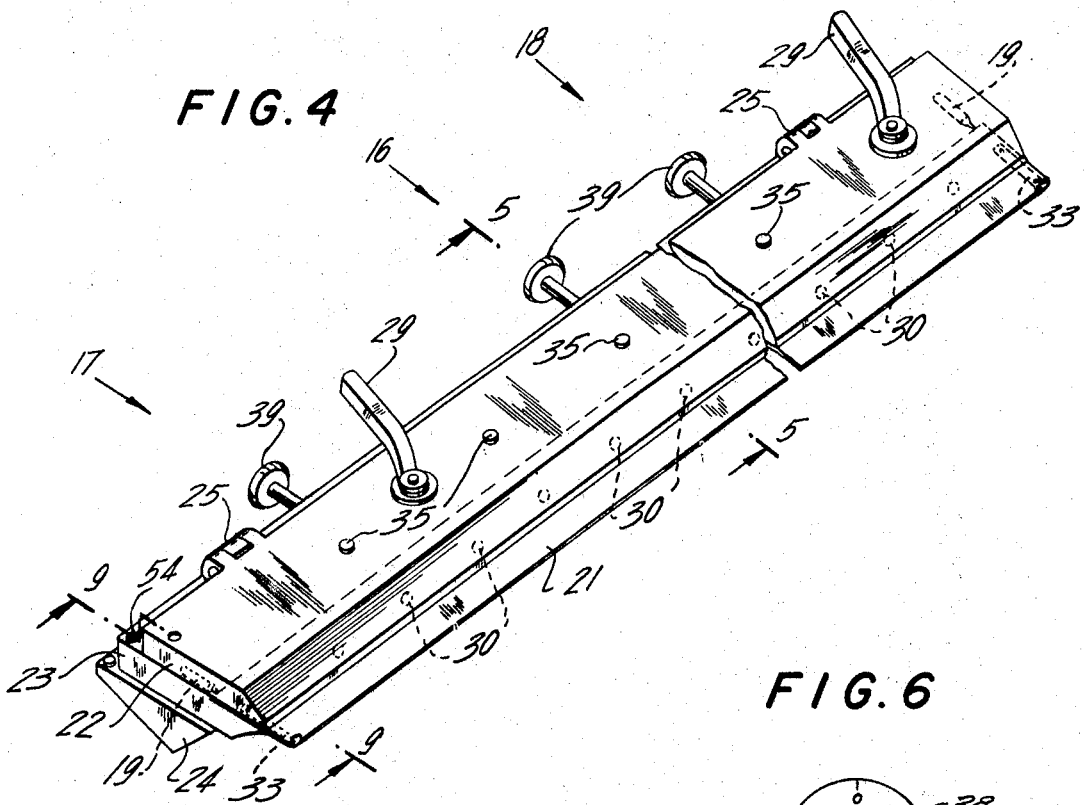

INVENTORS.
JACK BRYER
CHRISTOPHER PALI

July 21, 1970   C. PALI ET AL   3,521,561
METHOD AND APPARATUS FOR CONTOURING A ROTOGRAVURE DOCTOR BLADE
Filed Jan. 15, 1968                                4 Sheets-Sheet 4
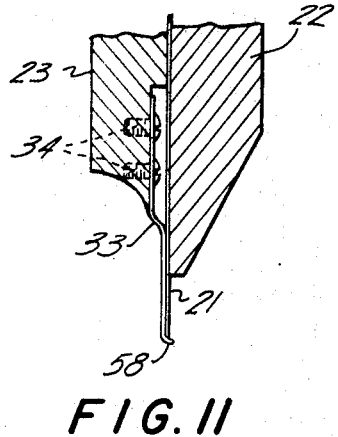
FIG. 11
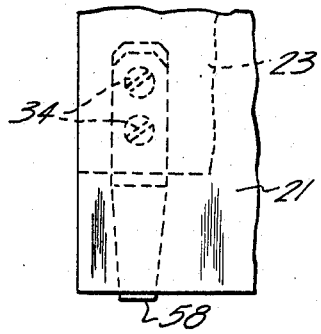
FIG. 12
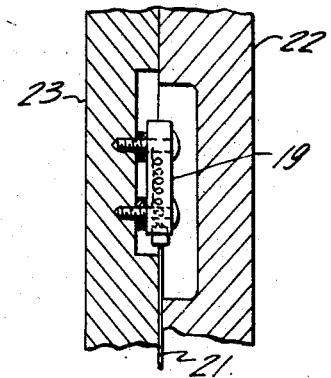
FIG. 13
FIG. 14
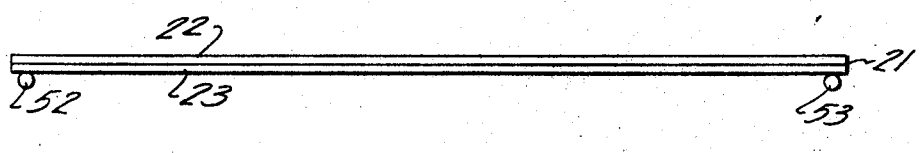
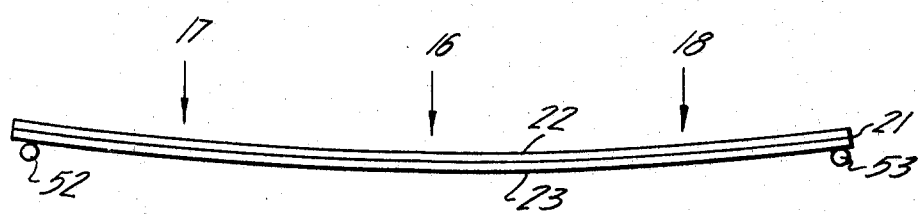
FIG. 15
INVENTORS.
JACK BRYER
CHRISTOPHER PALI United States Patent Office 3,521,561
Patented July 21, 1970

3,521,561
METHOD AND APPARATUS FOR CONTOURING A ROTOGRAVURE DOCTOR BLADE
Christopher Pali, Ramsey, and Jack Bryer, Paramus, N.J., assignors, by mesne assignments, to James Talcott Inc., New York, N.Y., a corporation of New York
Filed Jan. 15, 1968, Ser. No. 699,014
Int. Cl. B41f 9/10
U.S. Cl. 101—169          17 Claims

ABSTRACT OF THE DISCLOSURE

A device for contouring a doctor blade to conform it to the deflection in a rotogravure printing cylinder. A pair of clamping jaws, supporting therebetween a doctor blade, mounted on a support member having a rotatable shaft at a plurality of points along the support member connected at these points to the pair of jaws by means of worm, worm wheel and threaded bolt combination so that as the shaft is rotated the jaws holding the blade will be pulled toward the support member and the blade will be contoured.

BACKGROUND OF THE INVENTION

This invention relates generally to rotogravure or rotary intaglio printing presses and more particularly to a novel doctor blade mechanism and method of setting same for insuring a clean wiping action of a printing cylinder surface.

The general object of the present invention is to improve the contact between a doctor blade and printing cylinder and is accomplished by providing a device for conforming the doctor blade to the longitudinal deflections in a rotogravure printing cylinder.

Rotogravure or intaglio printing involves the immersion of a rotating copper printing cylinder having a highly polished surface etched with the design to be printed into a bath of printing ink to thereby fill the etched cells with the ink. A doctor blade mechanism is mounted adjacent to the printing cylinder and the blade wipes by scraping the printing cylinder surface clean leaving ink only in the etched cells. The ink is then pressed onto or otherwise transferred to a travelling web by an impression roller pressing the web against the printing cylinder.

It is known to those who practice the art of rotogravure printing, that precise setting of the doctor blade with respect to the printing cylinder surface in order to wipe the ink from the non-etched or non-printing surfaces is essential to good quality printing. Very elaborate devices and systems for obtaining this precise setting of the doctor mechanism have been heretofore devised as shown for example in U.S. Pats. Nos. 3,006,275 and 3,017,828.

The typical procedure for setting the doctor blade with respect to the printing cylinder is to pre-adjust the blade, either in its pre-clamped position or loosely clamped between a pair of jaws, against the printing cylinder while it is slowly rotating in the press by bringing the blade in its holder forward until some portion of the blade begins to contact and starts to wipe the cylinder surface. In many cases the edge of the blade and its holder might not be parallel to the surface of the cylinder, however various means to make them parallel have been developed. With the edge of the blade parallel to the surface of the cylinder the points at which the blade will usually contact the cylinder in the pre-adjusting step will be the two extremities of the blade. This is the zero-set position of the blade from which additional pressure is exerted by the blade on the cylinder until all points along the blade are in contact with the surface of the printing cylinder which should result in a clean wiping action.

This procedure has been adequate when used with narrow width printing cylinders. The amount of additional pressure required to bring all points of the blade into contact with the surface of the cylinder once initial contact is made will not be too great on the narrow-width presses and will therefore not create excessive stresses on the blade and cylinder surface. However, with the increased use of wider printing cylinders various problems have been encountered. The source of one of these problems is the increased deflection of the printing cylinder caused by increased pressures exerted on the cylinder by the impression rollers and by the increased length of the cylinder between bearing supports. In printing cylinders having a width of between 80 and 100 inches this deflection has been found to be as much as .010 to .020 inch. In order to bring all points of a conventional doctor blade into contact with a cylinder having such deflections it is necessary to exert great pressure on the blade. Such increased pressure has resulted in uneven pressure loading along the length of the blade and this has caused stresses to build up at those points of the blade where initial contact with the cylinder had been made in the pre-adjusting step of the blade setting procedure. It has been found that the most frequent point of blade cracking are at the extremities of the blade. This cracking has been found to be occurring with greater frequency on the wide width presses and has been attributed to the unusually high stresses on the blade at these points, as the extremities will be the point of initial contact.

This increased pressure on the cylinder, in order to achieve contact of all points of the blade with the cylinder, has also been the cause of damaging the copper plated surface of the cylinder by causing lines or scratch marks on the surface. In many cases it is impossible to repair the damage and will require the replacement of the entire cylinder, which is an expensive item.

An excessive amount of pressure of the blade on the copper plated cylinder will also cause undue wear of the highly polished surface.

It is accordingly an object of the present invention to provide a doctor blade mechanism having a construction which will eliminate the difficulties presented by the prior mechanisms when used on wide width rotogravure presses.

Another object of the present invention is to provide a doctor blade holder in which the doctor blade can be easily and accurately inserted and precisely set with respect to a printing cylinder, and in which the resultant loading on the blade will be uniform across its length.

Another object of the present invention is to provide a doctor blade mechanism requiring less pressure to be exerted by the doctor blade on the cylinder in order to achieve precise setting, thereby eliminating the major cause of cylinder damage.

A further object of this invention is to provide an improved method of precisely setting a doctor blade relative to a printing cylinder in order to achieve improved wiping action for quality printing.

Other objects, advantages and features of the present invention will become more apparent from the following detailed description in connection with the accompanying drawings.

BRIEF DESCRIPTION OF THE DRAWINGS

In the drawings.

FIG. 4 is another perspective view of the present invention from a different angle showing the invention in more detail;

FIG. 5 is a detailed section taken along lines 5—5 (center position) of FIG. 4;

FIG. 6 is a top view of the dial indicator on the shaft shown in FIG. 5;

FIG. 11 is a section view showing one of two locating stops for the doctor blade;

FIG. 12 is a front view of FIG. 11;

FIG. 13 shows the blade locating plunger;

FIG. 14 is a schematic view showing the doctor blade in its holder before being contoured by means of the present invention; and FIG. 15 is a schematic view showing the doctor blade in its holder after it has been contoured by means of the present invention.

DESCRIPTION OF THE PREFERRED EMBODIMENT OF THE PRESENT INVENTION

Figure 1:
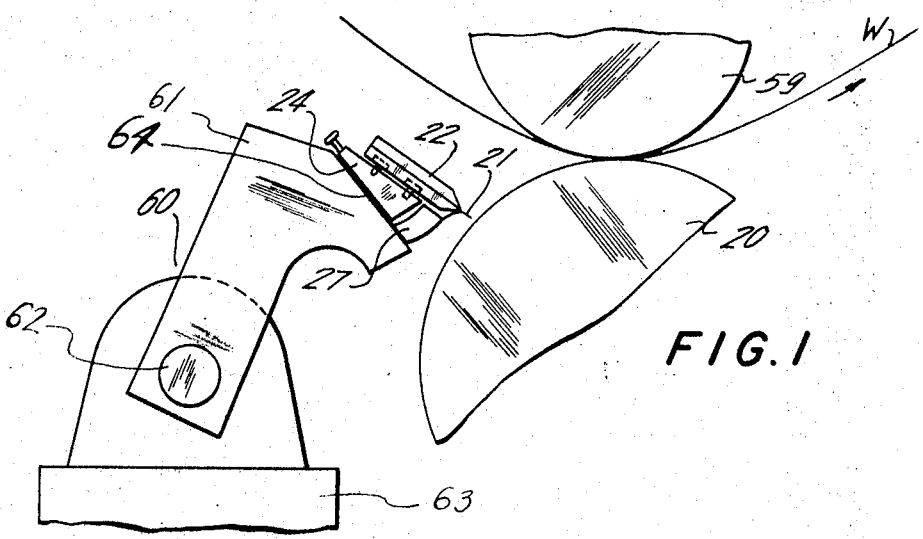
FIG. 1 is a side elevational view showing the present invention with relation to a printing cylinder and mounted on the mechanism for moving it toward and away from the cylinder.
Figure 2:
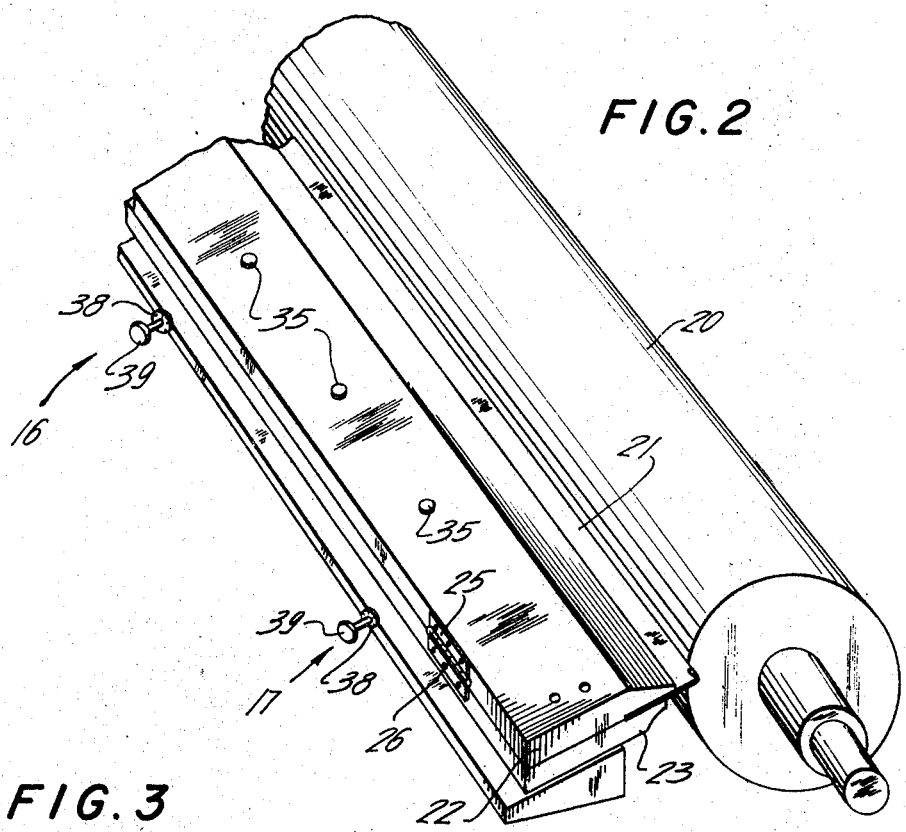
FIG. 2 is a perspective view showing the present invention in relation to a printing cylinder.

Turning to FIGS. 1 and 2 there is shown a printing cylinder 20 of a rotogravure printing press. This cylinder has a highly polished copper surface etched with the design to be printed and rotates while partially immersed in a bath of printing ink not shown. Mounted between the side frames of the press unit on a mechanism, shown only partially and referred to generally by numeral 60, for moving it toward and away from the printing cylinder 20 is doctor mechanism support member 24. The mechanism 60 for moving the doctor mechanism toward and away from the cylinder is not shown in detail or described herein as it forms no part of the present invention, however, the details of such a mechanism is substantially the same as that shown in U.S. Huck Pat. No. 2,854,923. Arms 61 are pivotally carried on a shaft 62 supported by carriage 63 which is supported for sliding movement parallel to the cylinder axis, so as to provide the required doctor blade reciprocation. A bar or plate 64 secured to arms 61 supports the member 24 which is secured to plate 64 so as to stiffen plate 24 against bending when the doctor holder is bent as later described. Pivotal adjustment of arms 61 provides for moving the doctor blade to and from the cylinder and adjusts the pressure of the blade against the cylinder. The support member 24 supports a pair of clamping jaws 22 and 23 joined by a pair of hinges 25 secured to each jaw by screws 26. FIG. 4 shows a preferred type of hinge to that shown in FIG. 2. The doctor blade 21 is clamped between the jaws and brought into contact with the surface of the printing cylinder 20 in order to wipe it clean of excess ink on the non-printing surfaces leaving only ink in the etched cells on the printing cylinder surface. Mounted in parallel tangential relationship to the cylinder 20 is an impression roller 59 for applying pressure to the paper web W passing between the cylinder 20 and roller 59, so as to press it into the etched cells of the cylinder so that it may pick up the ink therein.

Figure 3:
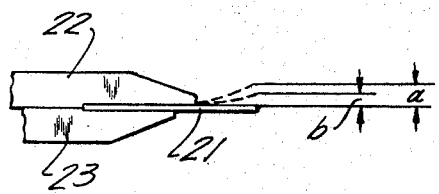
FIG. 3 is an end view of the doctor blade in its holder showing the deflection of the blade at various points on its length when pressure is applied by conventional means.

FIG. 3 shows the normal deflection of the blade 21 when pressure is applied to it in order to bring all points along the length of the blade into contact with the cylinder. As stated in the discussion above, the extremities of the blade will contact the cylinder first. This is due to the substantial deflections in the cylinder on wide-width presses caused by the pressure being exterted thereon by impression roller 59. Dimension $a$ represent the deflection in the blade at its extremities after pressure has been applied, while dimension $b$ represents the deflection of the blade at the center. It can be clearly seen that the deflection in the blade at the ends is substantially greater than the center point deflection thereby creating greater stresses at the end points. It is the purpose of the present invention to eliminate this inequality of pressure loading and stress concentration along the length of the blade by contouring the blade to conform it to the contoured surface of the cylinder.

The details of the present invention are shown more fully in FIGS. 4 and 5. The lower clamping jaw 23 has a plurality of magnets 30, uniformly spaced along its length and embedded in its upper surface for the purpose of facilitating the insertion and locating of the blade 21 between the jaws 22 and 23. Aligned with the magnets and secured to the lower surface of the upper clamping jaw 22 by screws 32 are a plurality of brass plates or discs 31. This brass disc acts to prevent the magnetic field emanating from the magnets 30 to penetrate the upper clamping jaw so that only the blade itself will be affected by the magnetic field. Also mounted on the lower clamping jaw 23 to further facilitate the insertion and proper location of the blade are a pair of blade locating stops 33 shown in more detail in FIGS. 11 and 12. These locating stops are positioned at the ends of the holder and are secured to the lower clamping jaw 23 by a pair of screws 34. Working in conjunction with the blade locating stop is a blade locating plunger 19 mounted in a recess between upper clamping jaw 22 and lower clamping jaw 23, as shown in FIG. 13. The plunger is mounted in place either by a pair of screws and sleeves as shown, or by a bracket. The plunger is spring loaded and so positioned such that the back edge of the blade contacts the plunger which urges the blade forward so that its front edge is properly aligned and abutting against the front lip 58 of the blade locating stops 33. The forward movement of the blade caused by the plunger is effectively stopped by the lip 58 of the locating stop and the blade is consequently properly located between the clamping jaws. The doctor blades are usually made of very hard steel strips which are usually supplied to the user in large coils. These coils are often difficult to handle and troublesome when unwinding the ribbon as it has a tendency to curl up.

In order to properly and easily insert the blade 21 into the holder of the present invention the upper clamping jaw 22 is swung away from the lower jaw 23 on the hinges 25 by means of handles 29. The blade is then slid along the inner face of the lower jaw 23 being held in place and prevented from curling up by magnets 30, and being located in proper position between the blade locating stops 33 and plungers 19. With the blade in position the upper clamping jaw is brought down and securely clamped together with the lower jaw by means of the jaw holding screws 35 located at various points along the length of the jaws.

With the blade properly located between the jaws and with the jaws securely clamped together the entire holder mechanism is brought toward the printing cylinder 20 by a mechanism 60 such as disclosed in the above mentioned Huck patent until the wiping edge of the blade at both extremities make initial contact with the cylinder, which we will call the zero setting. It is quite possible that when the entire holder is brought forward to the cylinder only one of the blade extermities will make initial contact with the cylinder. It is therefore necessary to adjust the holder on the mechanism 60 until both extremities of the blade are in initial contact before proceeding to the next step.

Figure 7:
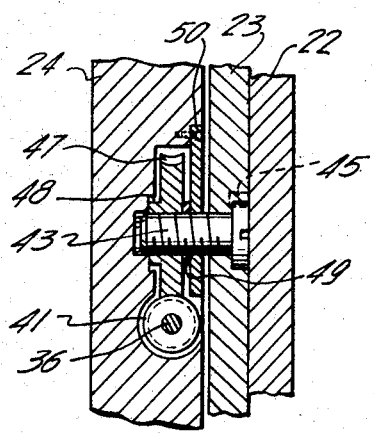
FIG. 7 is a section, taken along lines 7—7 of FIG. 5.

The next step in precisely setting the blade with respect to the cylinder is to contour the blade in order to conform it to the contoured surface of the printing cylinder by applying a force normal to the plane of the blade at its transverse axis. This is accomplished by the blade deflection mechanism shown in sectional detail in FIGS. 5, 7, and 8. While only one such mechanism located at the center 16 might be necessary for most conditions, two additional mechanisms located on either side of the center position, hereinafter referred to as the side deflecting mechanisms at the side adjustment positions 17 and 18, have been provided for reasons which will be later explained. FIG. 5 is a section view of the center deflection mechanism 16 and is identical with the two side deflection mechanisms 17 and 18 with some variations as exemplified in FIG. 8 and which will be explained more fully in subsequent portions of this specification. Mounted on the mechanism for moving the blade holder toward and away from the cylinder is a block 27 which supports a resilient member 28 which acts as a guard for preventing ink and other contaminants from getting into the blade contouring or deflection mechanism. The blade contouring or deflection mechanism for the center position comprises a shaft 36 running through the support member 24 parallel to the blade holding jaws 22 and 23. The shaft is rotatably supported in the member 24 by a sleeve 37 and extends beyond the end of the member. Mounted on the sleeve is an indicator dial 38 shown in detail in FIG. 6. Mounted on the extended end of the shaft 36, and secured thereto by set screw 40, is a knob 39 for rotating the shaft. Fitted onto the opposite end of the shaft 36 is a worm section 41 secured to the shaft by means of set screw 42. A center deflecting screw 43 passes through the lower clamping jaw 23 and is prevented from rotating therein by locking screw 45 as seen in FIG. 7. A worm wheel 47 having an internal thread is threaded on deflecting screw 43 and engages worm section 41. It can be seen in FIG. 7 that worm wheel 47 is prevented from lateral movement along screw 43 by means of its hub 48 abutting against the cutout portion of support member 24 on one side, and by means of a washer or spacer 49 on its other side. The spacer 49 is held in place by plate 50 which is secured by screws to member 24. Consequently, rotation of worm wheel 47 caused by rotation of shaft 36 will not result in its own axial movement along deflection screw 43, but can only result in movement of the screw itself. Member 24 is preferably stiff and jaws 22 and 23 comparatively deflectable.

Figure 8:
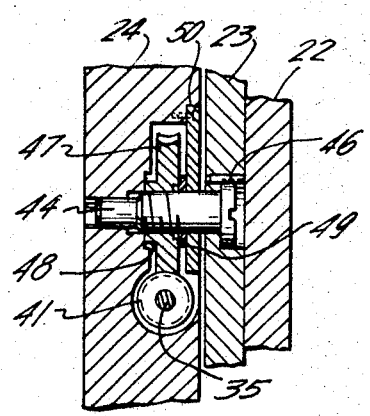
FIG. 8 is a section view similar to that of FIG. 7 for one of the side positions.

In operation, after the holder with the blade has been brought into parallel relationship with the longitudinal axis of the printing cylinder and into initial contact with the cylinder surface, i.e. the "zero-set" position, the pointer 51 on the knob 39 will be aligned with the zero mark on the indicator dial 38. The operator will now contour the blade to conform it to the deflected surface of the printing cylinder by first turning the knob 39 of the center deflection mechanism 16 in a clockwise direction until surface contact of the blade is made with the cylinder at the center point. The pointer 51 will now be aligned with a mark on the indicator dial other than zero which can be used for future reference. When the knob 39 is turned in a clockwise direction the shaft 36 and worm section 41 will also rotate in the clockwise direction. The worm section 41 can be either left-handed or right-handed. In either case the angle of the worm wheel 47 will be consistent with that of the worm such that when the worm is rotated in a clockwise direction the resulting rotation of the wheel 47 having an internal thread will cause the deflection screw 43 to move axially into the support member 24 thereby causing the blade holder, i.e. jaws 22 and 23, and the blade 21 to be bent into conformity with the deflections of the cylinder. The amount which the blade 21 will have to be bent in order to properly contour it depends upon the width of the cylinder. However, in most cases the cylinder deflection will be between .010 inch and .020 inch. The amount of the contouring of the blade which is required will depend also on the blade angle and edge position and may be several times as great. In most situations this single adjustment at the center position 16 will be adequate to conform the blade to the surface of a cylinder having a symmetrical contour caused by a full width impression roller. However, in some cases further fine adjustment at the side positions 17 and 18 will be necessary to achieve a uniform contour of the blade even where the contour is symmetrical. In these situations the operator will now adjust the two side deflection mechanisms in a like manner as for the center position so that a smooth and uniform contour of the blade will be achieved. The mechanism at the side positions varies from that at the center position in one respect as can be seen in FIG. 8. When the center point is adjusted and the blade is deflected from the center it will naturally be contoured along the entire length of the blade but possibly not to the desired amount. At the side positions the jaws will be slightly and symmetrically moved toward the support member 24, but not a sufficient amount to contour the blade uniformly so that all points along its wiping edge conform to the deflections in the cylinder. In order to accomplish this the knobs of the side mechanisms 17 and 18 will have to be rotated in a clockwise direction without causing further contouring of the blade until the side deflection screw 44 is axially moved into the support member 24 so as to take up the slack caused by the jaws 22 and 23 having already been moved slightly toward the support member. For this reason the side deflection screws 44 and lower clamping jaw 23 and support member 24 are so designed, as shown in FIG. 8, such that the screw 44 can be axially moved, within certain limits, without causing deflection of the jaws and blade. As in the center position screw 44 is prevented from rotating and therefore limited to axial movement by pin 46. By comparison, the center deflection screw 43 and its associated housing is so designed such that any axial movement of the screw 43 caused by rotation of the shaft 36 will result in a deflection of the clamping jaws 22 and 23 and the doctor blade 21. Further, by rotating the center deflection shaft 36 in a counterclockwise direction it is possible to push the jaws and blade away from the support member in order to straighten out the blade. It would not be possible to push the jaws away from the support member at the side deflection position by turning the shaft in a counterclockwise direction, rather it would only result in axial movement of the side deflection screws 44 without effecting movement of the jaws. After the side deflection knobs have been rotated a sufficient amount to take up any slack, caused by the adjustment of the center position, the operator can continue to rotate the side deflection knobs until the blade is uniformly contoured to the deflections in the printing cylinder so that all points along the length of the blade wiping edge will now make surface contact with the cylinder.

In order to permit the deflection of the blade, caused by adjustment of the center mechanism alone or in conjunction with the side mechanism, to result in a uniform contour it is necessary to mount the jaws on non-fixed supports in the supporting member 24. If the jaws were fixedly mounted the result of deflecting the blade would be a buckled curve approximating sine waves at each end, rather than a uniform concave contour. Accordingly the jaws 22 and 23 are freely supported as seen in FIG. 14 on a pair of pivot bars 52 and 53. The result of deflecting the jaws and blade is therefore a uniform contour as shown schematically in FIG. 15.

Figure 9:
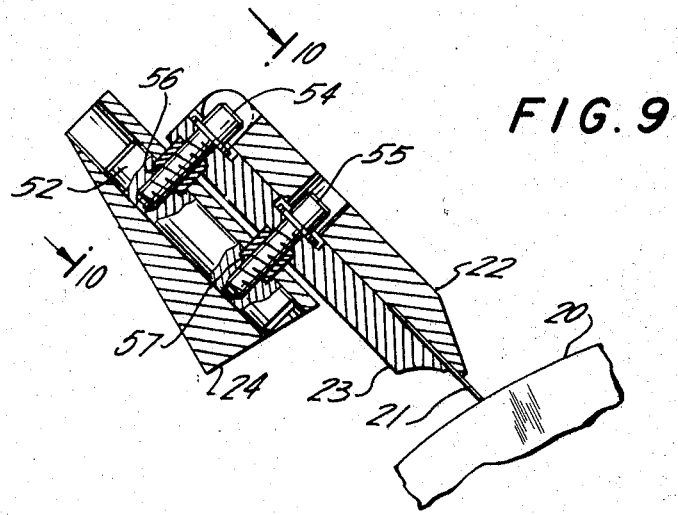
FIG. 9 is a detailed section taken along lines 9—9 of FIG. 4.
Figure 10:
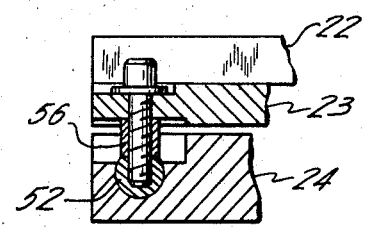
FIG. 10 is a section view taken along lines 10—10 of FIG. 9.

Turning now to FIGS. 9 and 10, pivot bar 52 is set in support member 24 at a point very close to the end. Bolts 54 and 55 pass through openings in clamping jaw 23, bushings 56 and 57 and support member 24 and are secured in pivot bar 52. The bushings 56 and 57 further act as a key to be fitted into slots on the pivot bar 52 so that the bolts 54 and 55 are properly aligned. This construction permits the clamping jaws to be freely supported on the support member 24 so that a uniform contour, as shown in FIG. 15 may be obtained.

While a single adjustment at the center position might be sufficient to conform the blade to the contour of some cylinders, further adjustment at the end positions will invariably be necessary as discussed above. In other cases primary adjustment of either of the side deflection mechanisms will be absolutely essential. One such situation is the case in which the same press unit is used to run off a half-width web thereby requiring the use of a half-width impression roller to thereby apply pressure to only half the cylinder. When running half width paper rolls the cylinder loading will therefore be non-symmetrical. The cylinder deflection will consequently also be non-symmetrical and adjustment of the side deflection mechanism will therefore be essential in order to achieve non-symmetrical contour of the blade to conform it to the non-symmetrical deflections in the cylinder.

With the blade 21 properly contoured to conform to the deflected surface of the printing cylinder so that all points along the length of the blade are in surface contact with the cylinder the final step in precisely setting the blade can be made. This final adjustment is accomplished with a mechanism as in Huck patent supra. This final step comprises the exertion of pressure by the blade on the cylinder in order to achieve a smooth wiping action, by bringing the blade in its holder toward the cylinder until the edge of the blade is slightly deflected. It can now be appreciated however that the amount of additional pressure required to get this smooth and even wipe is much less than would be required if the deflection mechanism of the present invention were not available or not used. Further, the exertion of this addtional pressure will not result in an uneven pressure loading along the length of the blade, as all points of the blade are already in initial surface contact with the cylinder before any additional pressure is applied. Consequently no stress concentrations will be caused to build up in certain portions of the blade and the possibilities of cracking of the blades will be sharply diminished. Finally, the reduced amount of additional pressure will result in less chance of damage to the cylinder.

What is claimed is:

1. A method of precisely setting a doctor blade in a blade holder relative to a printing cylinder of a rotogravure printing press for wiping the cylinder surface clean of excess ink comprising the steps of inserting the blade between an upper and a lower clamping jaw pivotally hinged together which comprises the holder, locating the wiping edge of the blade in proper alignment with the longitudinal axis of the printing cylinder simultaneously with the step of inserting the blade, the steps of inserting the blade between the clamping jaws and locating the blade further comprise the steps of swinging said upper jaw pivotally away from said lower jaw, inserting the blade between a plunger and a locating stop mounting on the upper surface of said lower jaw, sliding the blade along the upper surface of said lower jaw, and holding said blade on said upper surface by magnetic attraction of a plurality of magnets embedded in said lower jaw so that said blade is prevented from curling up, clamping said jaws together so that the blade is securely held there between, swinging the holder toward the printing cylinder until initial contact is made between both end points of the blade wiping edge and the surface of the printing cylinder, applying a force at the transverse center line of the blade in a downward direction normal to the plane of the blade for bending the blade symmetrically about its transverse axis to conform the blade to the symmetrical contoured surface of the printing cylinder so that substantially all points aong the length of the wiping edge of the blade are in surface contact with the printing cylinder, and bringing the blade forward toward the printing cylinder a second time thereby applying pressure between the blade and the cylinder so as to slightly deflect the blade in order to insure good wiping action of the blade on the cylinder surface to achieve good quality printing.

2. A method of precisely setting a doctor blade in a blade holder relative to a printing cylinder of a rotogravure printing press for wiping the cylinder surface clean of excess ink comprising the steps of inserting the blade between an upper and a lower clamping jaw pivotally hinged together which comprises the holder, locating the wiping edge of the blade in proper alignment with the longitudinal axis of the printing cylinder simultaneously with the step of inserting the blade, the steps of inserting the blade between the clamping jaws and locating the blade further comprise the steps of swinging said upper jaw pivotally away from said lower jaw, inserting the blade between a plunger and a locating stop mounted on the upper surface of said lower jaw, and holding said blade on said upper surface by magnetic attraction of a plurality of magnets embedded in said lower jaw so that said blade is prevented from curling up, clamping said jaws together so that the blade is securely held therebetween, swinging the holder toward the printing cylinder until initial contact is made between both end points of the blade wiping edge and the surface of the printing cylinder, applying a force at the transverse center line of the blade in a downward direction normal to the plane of the blade for bending the blade symmetrically about its transverse axis to conform the blade to the symmetrical contoured surface of the printing cylinder so that substantially all points along the length of the wiping edge of the blade are in surface contact with the printing cylinder, and bringing the blade forward toward the printing cylinder a second time thereby applying pressure between the blade and the cylinder so as to slightly deflect the blade in order to insure good wiping action of the blade on the cylinder surface to achieve good quality printing, precisely setting a doctor blade relative to printing cylinder according said bending of the blade resulting in a deflection of .001 inch or greater at the center point.

3. A doctor blade mechanism for contouring a doctor blade to conform it to the contoured surface of a rotating rotogravure printing cylinder comprising—
 a support member mounted on a mechanism for moving said doctor blade mechanism toward and away from said printing cylinder;
 a pair of clamping jaws pivotally hinged together and freely supported on said support member;
 a doctor blade held between said clamping jaws having a wiping edge thereof protruding beyond the jaws;
 a plurality of holding means located along the length of the pair of jaws for securely holding said jaws together and for securing said blade between said jaws; and
 a plurality of deflection mechanisms mounted within said support member for applying a downward force on the jaws, which support the blade, in a direction perpendicular to the plane of the blade so as to bend the jaws and therefore the blade into conformity with the contoured surface of the printing cylinder.

4. The doctor blade mechanism according to claim 3 wherein said deflection mechanisms for bending the blade comprise—
 a shaft rotatably mounted in said support member;
 a worm attached to one end of said shaft;
 a deflection screw attached to said pair of jaws having its threaded end extend into said support member;
 a worm wheel having an internal thread positioned on said deflection screw adjacent to said worm and engaging said worm;
 said worm wheel being constrained from axial movement on said deflection screw; and
 means mounted on the other end of said shaft for causing rotation of said shaft whereby said worm wheel is caused to rotate as a result of rotation of said shaft so as to cause said deflection screw to move downwardly into said support member thereby bending said blade.

5. The doctor blade mechanism according to claim 4 wherein said pair of jaws are supported at each end on a pivot bar mounted in said support member resulting in a non-fixed support of the jaws on the support member so that said bending force applied to said blade by said deflection mechanism will result in a uniform contour.

6. The doctor blade mechanism according to claim 5 wherein one of said deflection mechanisms is located at the center of said support member for causing a bending force to be applied at the transverse axis of the blade and in a direction normal to the plane of the blade so as to result in a symmetrical contour of the blade to conform it to the symmetrically contoured surface of a printing cylinder having pressure from a full-width impression roller applied thereto.

7. The doctor blade mechanism according to claim 6 wherein further deflection mechanisms are located on either side of said center deflection mechanism for causing a bending force to be applied to said blade at points other than the center point so as to result in a non-symmetrical contour of the blade in order to conform it to the non-symmetrical contoured surface of a printing cylinder having the pressure of a half-width impression roller applied thereto.

8. The doctor blade mechanism according to claim 7 further comprising means mounted on the lower jaw of said pair of jaws for facilitating proper insertion and location of said blade between said jaws and means mounted on said lower jaw for preventing said blade from curling up while said blade is being inserted between said jaws.

9. The doctor blade mechanism according to claim 8 further comprising means mounted on the extended end of said shaft for indicating the relative rotation of said shaft thereby indicating the relative bending of said doctor blade.

10. The doctor blade mechanism according to claim 3 wherein said pair of jaws are supported at each end on a pivot bar mounted in said support member resulting in a non-fixed support of the jaws on the support member so that said bending force applied to said blade by said deflection mechanism will result in a uniform contour.

11. The doctor blade mechanism according to claim 10 wherein one of said deflection mechanisms is located at the center of said support member for causing a bending force to be applied at the transverse axis of the blade and in a direction normal to the plane of the blade so as to result in a symmetrical contour of the blade to conform it to the symmetrically contoured surface of a printing cylinder having pressure from a full-width impression roller applied thereto.

12. The doctor blade mechanism according to claim 11 wherein further deflection mechanisms are located on either side of said center deflection mechanism for causing a bending force to be applied to said blade at points other than the center point so as to result in a non-symmetrical contour of the blade in order to conform it to the non-symmetrical contoured surface of a printing cylinder having the pressure of a half-width impression roller applied thereto.

13. The doctor blade mechanism according to claim 12 further comprising means mounted on the lower jaw of said pair of jaws for facilitating proper insertion and location of said blade between said jaws and means mounted on said lower jaw for preventing said blade from curling up while said blade is being inserted between said jaws.

14. The doctor blade mechanism according to claim 13 wherein said blade locating means comprises a locating plunger being spring load for engaging the back edge of said blade so as to urge the blade forward and, a blade locating stop having a front lip for holding said blade in place between said jaws so that forward movement of said blade caused by said plunger is stopped thereby properly locating said blade, said locating plunger and said locating stop having their axes aligned and located at each end of said jaws.

15. The doctor blade mechanism according to claim 13 wherein said means for preventing the blade from curling comprises a plurality of magnets embedded in the upper surface of said lower jaw for causing said blade to be held on the surface of said jaw by magnetic attraction.

16. The doctor blade mechanism according to claim 15 further comprising a plurality of brass discs mounted on the lower surface of the upper jaw of said pair of jaws and aligned with each of said magnets on said lower jaw for insulating said upper jaw from the magnetic field of said magnets so that only said doctor blade is affected by said magnetic field.

17. An apparatus for contouring a doctor blade to conform it to the deflected surface of a rotating rotogravure printing cylinder comprising—
- a support member mounted on a mechanism for moving said apparatus toward and away from said cylinder;
- an upper and a lower clamping jaw hinged together for securely holding therebetween a doctor blade having its wiping edge protrude beyond the edge of said jaws;
- said jaws being supported on said support member on a pair of pivot bars so as to form a non-fixed support;
- means for securing said jaws together during operation;
- blade locating means mounted between said upper and lower jaws for properly locating said blade therebetween;
- means mounted on said lower jaw for preventing said blade from curling up during the insertion of said blade between said jaws;
- a worm and worm wheel combination mounted within said support member located at least at one point along the length of said member, said one point being the center position, said worm wheel having an internal thread and restricted to rotational movement only;
- means attached to said worm for causing rotation of said combination;
- a threaded bolt attached to said jaws and extending into said support member and threaded through said worm wheel;
- whereby as said worm and worm wheel combination is caused to rotate by said rotataing means said threaded bolt is caused to be axially moved further into said support member thereby bending said jaws about its transverse axis resulting in a contour of said doctor blade held between said jaws to conform it to the deflected surface of said printing cylinder.

References Cited
UNITED STATES PATENTS

| | | | |
|---|---|---|---|
| 1,862,744 | 6/1932 | Fankboner | 101—365 |
| 2,078,520 | 4/1937 | Wolf | 101—365 |
| 2,278,138 | 3/1942 | Paardecamp | 101—157 |
| 2,688,919 | 9/1954 | Kaiser | 101—169 X |
| 3,017,828 | 1/1962 | Behringer | 101—157 |
| 3,309,992 | 3/1967 | Motter | 101—169 |

ROBERT E. PULFREY, Primary Examiner

J. R. FISHER, Assistant Examiner

U.S. Cl. X.R.

101—170